United States Patent [19]
Porterfield

[11] Patent Number: 6,122,677
[45] Date of Patent: Sep. 19, 2000

[54] METHOD OF SHORTENING BOOT UPTIME IN A COMPUTER SYSTEM

[75] Inventor: A. Kent Porterfield, New Brighton, Minn.

[73] Assignee: Micron Technology, Inc., Bosie, Id.

[21] Appl. No.: 09/045,974

[22] Filed: Mar. 20, 1998

[51] Int. Cl.[7] .......................... G06F 9/445; G06F 13/00
[52] U.S. Cl. ................... 710/10; 710/8; 710/9; 710/46; 710/109; 713/1; 713/2; 713/100
[58] Field of Search ................ 710/8, 9, 46, 107, 710/104, 109, 124, 128, 10; 713/1, 2, 100

[56] References Cited

U.S. PATENT DOCUMENTS

| | | | |
|---|---|---|---|
| 5,379,384 | 1/1995 | Solomon | 710/128 |
| 5,542,055 | 7/1996 | Amini et al. | 710/101 |
| 5,568,619 | 10/1996 | Blackledge et al. | 710/101 |
| 5,675,794 | 10/1997 | Meredith | 713/1 |
| 5,761,448 | 6/1998 | Adamson et al. | 710/104 |
| 5,850,397 | 12/1998 | Raab et al. | 370/392 |
| 5,864,698 | 1/1999 | Krau et al. | 713/2 |
| 5,904,733 | 5/1999 | Jayakumar | 713/2 |
| 5,933,609 | 8/1999 | Walker et al. | 710/101 |
| 5,935,226 | 8/1999 | Klein | 710/101 |
| 5,935,242 | 8/1999 | Madany et al. | 713/1 |

*Primary Examiner*—Thomas C. Lee
*Assistant Examiner*—Tammara Peyton
*Attorney, Agent, or Firm*—Knobbe, Martens, Olson & Bear LLP

[57] ABSTRACT

A method of configuring peer devices without the unnecessary delay in boot up time using a compatibility bridge. Upon initiating a configuration cycle, a BIOS initialization scans all peer devices located on the host bus. A watchdog timer times out after a predetermined duration when the intended device fails to respond to the configuration cycle. A bit corresponding to the particular device is set in a scorecard register. The compatibility bridge responds to the configuration cycle after the watchdog time-out period.

16 Claims, 3 Drawing Sheets

METHOD OF SHORTENING BOOT UPTIME IN A COMPUTER SYSTEM

RELATED APPLICATIONS

The subject matter of U.S. patent application entitled SYSTEM FOR CONFIGURING PEER DEVICES, filed on even date herewith, application Ser. No. 09/045,975, still pending is related to this application.

BACKGROUND OF THE INVENTION

1. Field of the Invention

The invention relates generally to information processing systems. More particularly, this invention relates to control and data signal transfers within a computer system having a multiple bus architecture.

2. Description of the Related Art

Information processing systems, such as personal computers (PCs), have virtually become an inseparable part of everyone's daily activities. These systems process an enormous amount of information in a relatively short time. To perform these sophisticated tasks, a computer system typically includes a microprocessor, memory modules, various system and bus control units, and a wide variety of data input/output (I/O) and storage devices. These computer components communicate control and data signals using various data rates and signal protocols over multiple system buses. The demand for faster processing speed, and the revolutionary fast-track development of computer systems, have necessitated the use of interconnecting devices. These devices act as compatibility bridges among various data transfer protocols within the computer system. One example of such interconnecting devices is the peripheral component interconnect (PCI) bridge.

The *PCI Local Bus Specification, Revision* 2.1 ("PCI Specification") defines a PCI Local Bus with the primary goal of establishing an industry standard. The PCI Local Bus is a 32-bit or 64-bit bus with multiplexed address and data lines. The bus is intended for use as an interconnect mechanism between highly integrated peripheral controller components, peripheral add-in boards, and processor/memory systems. The PCI Specification includes the protocol, electrical, mechanical, and configuration specification for PCI Local Bus components and expansion boards.

FIG. 1 shows an exemplary computer system using a conventional bus architecture. As shown in FIG. 1, a central processor unit (CPU) 100 is connected to a Host bus 110. On the Host bus 110, a plurality of host bus compatible devices (not shown in this figure) may be connected to access and exchange control and data signals with the CPU 100. Typically, a Host-PCI bridge 120 is employed to connect the Host bus 110 to a PCI Bus 0 130. The Host-PCI bridge 120 allows one or more PCI device to access devices that are resident on the Host bus 110 (e.g., the CPU 100). Typical PCI devices ("peer devices") include an audio card, a motion video card, a local area network (LAN) interface, a small computer system interface (SCSI), an expansion bus interface, a graphics card, or other PCI-PCI bridges.

To support industry standard architecture (ISA) devices, a PCI-ISA bridge 140 is used to connect an ISA bus 150 to the PCI bus 0 130. ISA devices may include a floppy drive, a key board, a mouse, a serial port, a parallel port, a read only memory (ROM) unit, a real-time clock (RTC), and/or an audio interface (not shown in this figure). In addition to the PCI-ISA bridge 140, one or more PCI-PCI bridges may be connected to the PCI bus 0 130 to generate additional PCI buses. Two PCI-PCI bridges are implemented including a PCI-PCI bridge 160 which generates a PCI bus 1 170, and a PCI-PCI bridge 180 which generates a PCI bus 2 190. The additional PCI buses 170 and 190 support additional PCI devices.

The *PCI Specification* provides for software driven initialization and configuration via a Configuration Address Space. Typically, systems provide a mechanism that allows PCI configuration cycles by software. This mechanism is typically located in the Host-PCI bridge 120. PCI devices are required to provide 256 bytes of configuration registers for this purpose. Each PCI device decodes its own address for normal accesses. To support hierarchical PCI buses, two types of configuration access are typically used: Type 0 and Type 1. Type 0 configuration accesses do not propagate beyond the local PCI bus (i.e., PCI bus 0 130). Hence, Type 0 configuration accesses are claimed by a local PCI device (i.e., resident on PCI bus 0 130). Whereas, a Type 1 configuration access is used when the target PCI device of a configuration access resides on another PCI bus (i.e., not the local PCI bus). Type 1 accesses are ignored by all target devices except PCI-PCI bridges. A PCI-PCI bridge (e.g., PCI-PCI bridge 160) decodes a Bus Number field from the configuration access to determine if the destination of the configuration access is resident behind the PCI-PCI bridge. Accordingly, the PCI-PCI bridge 160 claims the configuration access if the access is to a bus behind the PCI-PCI bridge 160 (the "secondary bus"). If the Bus Number is not for a bus behind the PCI-PCI bridge 160, the PCI-PCI bridge 160 ignores the configuration access. If the Bus Number matches the secondary bus (i.e., PCI bus 2 190) of the PCI-PCI bridge 160, the PCI-PCI bridge 160 converts the Type 1 configuration access into a Type 0 configuration access. Then, a Device Number is decoded from the configuration access to select one of 32 devices on the local bus. The PCI-PCI bridge 160 asserts the correct Device Select and initiates a configuration access.

Recently, an OnNow design initiative was introduced as a comprehensive, system-wide approach to system and device power control. OnNow is a term for a PC that is always on but appears off and responds immediately to user or other requests. The OnNow design initiative involves changes that will occur in both the Microsoft Windows 98 and Windows NT operating systems, device drivers, hardware, and applications. OnNow relies on the changes defined in the Advanced Configuration and Power Interface (ACPI) v. 1.0 specification. The ACPI specification defines standards which enable PC systems to automatically turn on and off peripherals such as CD-ROMs, network cards, hard disk drives, and printers.

A configuration cycle comprises a series of read and/or write actions executed to set a device in a desired state or mode of operation. On a host bus, the configuration cycle is sometimes referred to as the "configuration transaction." On a PCI bus, the configuration cycle is commonly referred to as the "configuration cycle." For the purpose of this disclosure, the term "configuration cycle" is used to mean either "configuration cycle" or "configuration transaction."

In an attempt to speed up configuration cycles, and satisfy design initiatives such as OnNow, a watchdog timer may be implemented in the Host-PCI bridge 120. Upon initiating a configuration cycle by the CPU 100, and if a peer device is present in the system, the peer device responds to the configuration cycle. If a peer device is not installed in the system, the watchdog timer terminates the cycle after a predetermined critical time. If this critical time is too short, then configuration cycles for present peer devices may be terminated prematurely, thereby causing a system failure. If, on the other hand, the critical time is too long, then the system takes excessive time to configure peer devices and boot up the system. Laboratory measurements have shown that, while a system boot up is more certain with a longer critical time, the system may take several seconds longer than necessary to boot up. This excessive boot up time is incompatible with the new fast boot up standards, such as OnNow. Therefore, there is a need in the technology to expedite the configuration cycles without causing a system failure.

SUMMARY OF THE INVENTION

To overcome the above-mentioned problems, the invention provides a method for configuring peer devices without the unnecessary delay in boot up time. The method determines whether a configuration cycle is intended for a peer device on the Host bus, or for a peer device which may exist on the Local PCI bus. Once the presence of each peer device is determined, no further bus time-outs need occur.

In accordance with one embodiment of the invention, the method configures peer devices in an information processing system having a host bus. The method comprises initiating a configuration cycle to a device on the host bus, and scanning the device on the host bus. The method further comprises modifying the logical state of a bit corresponding to the device in a compatibility bridge. The method further comprises responding to the configuration cycle using the compatibility bridge.

BRIEF DESCRIPTION OF THE DRAWINGS

The above and other aspects, features and advantages of the invention will be better understood by referring to the following detailed description, which should be read in conjunction with the accompanying drawings, in which.

DETAILED DESCRIPTION OF THE INVENTION

A detailed description of the method of configuring peer devices is provided below. As one embodiment of the invention, it is not intended to limit the enumerated claims, but to serve as a particular example thereof.

Figure 2:
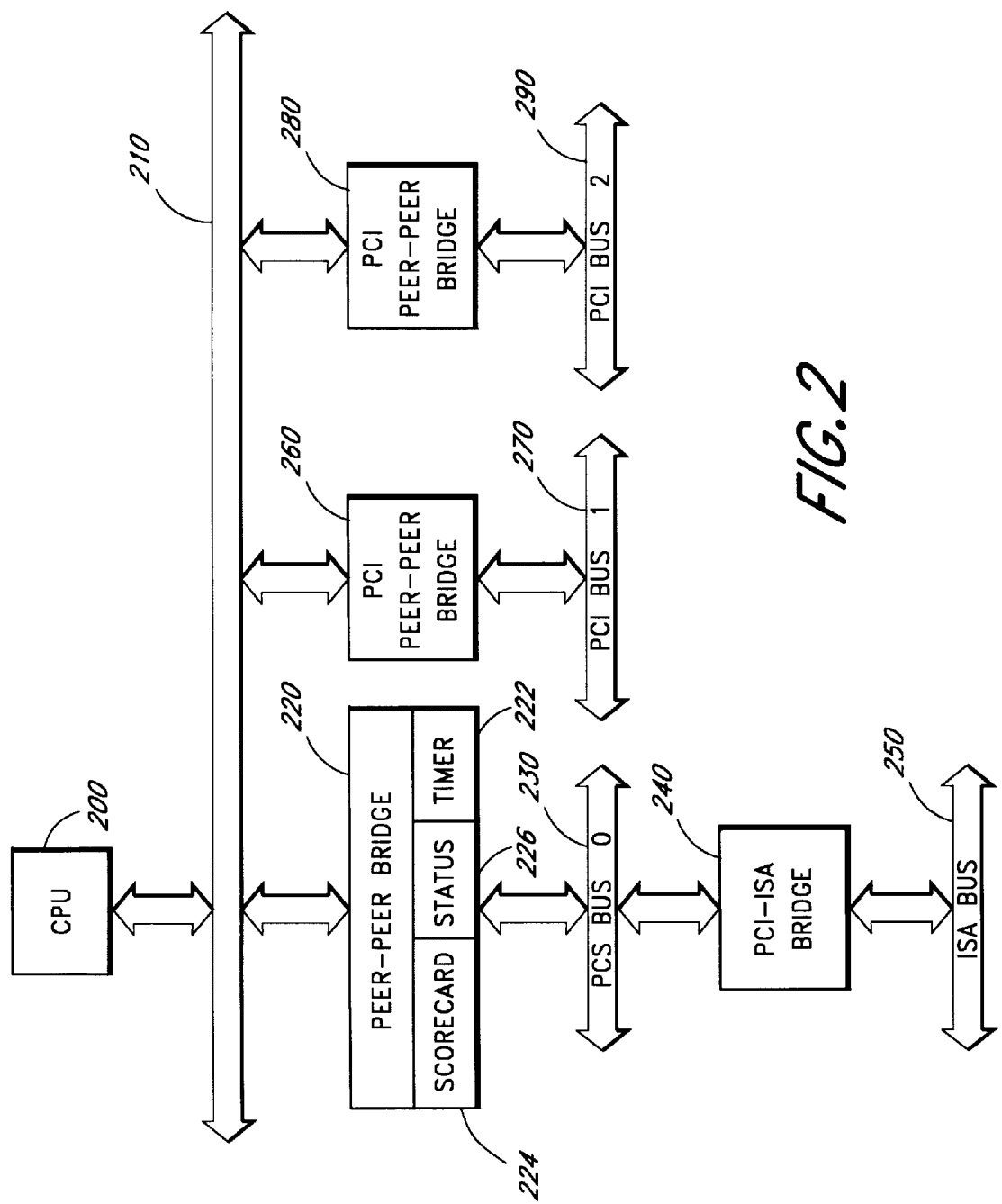
FIG. 2 is a functional block diagram of one embodiment of a peer to peer PCI bridge architecture.

In accordance with one embodiment of the invention, a method of configuring peer devices is provided in a computer system having up to 32 peer devices. FIG. 2 is a functional block diagram of one embodiment of a peer to peer PCI bridge architecture of the invention. As shown in FIG. 2, a CPU 200 is connected to a Host bus 210 to communicate control and data signals to and from other devices on the Host bus 210. Typically, one or more PCI-PCI bridges are connected to the Host bus 210 to allow PCI bus compatible device to communicate with host bus devices, e.g., the CPU 200. Each of the PCI-PCI bridges may be considered as a peer device. Hence, up to 32 PCI-PCI bridges may be connected to the Host bus 210. This invention applies to all types of peer devices and, hence, is not limited to PCI-PCI bridge peer devices.

In this embodiment, three PCI Peer-Peer bridges are shown connected to the Host bus 210: a first PCI Peer-Peer bridge 220, a second PCI Peer-Peer bridge 260, and a third PCI Peer-Peer bridge 280. The first PCI Peer-Peer bridge 220, connecting the Host bus 210 to the PCI bus 230, may be designated as the "compatibility bridge." The compatibility bridge 220 accepts all cycles which are not directed towards any of the other Peer-Peer bridges. The PCI Peer-Peer bridges 220, 260, and 280 connect to a PCI bus 0 230, PCI bus 1 270, and PCI bus 2 290, respectively. A PCI-ISA bridge 240 is connected to the PCI bus 0 230 to connect to an ISA bus 250, thereby allowing ISA devices to access the PCI and Host buses. The compatibility bridge 220 may include a watchdog timer 222, a configuration register 224 (the "scorecard register"), and a status register 226. While each peer device is physically residing on the Host bus 210, each peer device may logically be considered to be residing on the PCI bus 0 230.

The compatibility bridge 220 employs the scorecard register 224 to determine which configuration cycles are directed to peer devices that physically reside on the Host bus 210, and which configuration cycles are directed to peer devices that physically reside on the PCI bus 0 230. Pursuant to the *PCI Specification,* up to 32 devices may be connected to a PCI bus. Hence, the scorecard register 224 comprises 32 bits, with each bit corresponding to a peer device. When a configuration cycle is initiated to a particular device, the compatibility bridge 220 checks the logical state of the bit corresponding to that device in the scorecard register 224. If the bit is set to 1, the compatibility bridge 220 forwards the configuration cycle to the PCI bus 230. If the bit is clear (i.e., set to 0), the compatibility bridge 220 does not claim the cycle on the Host bus 210 and, hence, does not forward the configuration cycle to the PCI bus 230. Accordingly, the compatibility bridge 220 allows another peer device to claim the configuration cycle on the Host bus 210.

Furthermore, as noted above, the compatibility bridge 220 includes a watchdog timer 222 and a status register 226. The status register 226 includes a status bit indicating the occurrence or non-occurrence of a timeout. Once a configuration cycle is initiated on the Host bus 210, the watchdog timer 222 begins incrementing a counter (not shown) for each clock cycle until a peer device on the Host bus 210 responds to the configuration cycle. If a peer device responds, the counter is reset, and no further action is taken. If a peer device on the Host bus 210 does not respond within a predetermined period of time, then the watchdog timer 222 initiates a bus timeout. Upon detecting the bus timeout, the compatibility bridge 220 terminates the cycle on the Host bus 210, and sets the status bit of the status register 226 to indicate that a bus timeout has occurred. The cycle appears to the CPU 200 as having terminated normally.

Using the method of the invention, peer device contention on the Host bus 210 is eliminated. The Host bus 210 may not be allowed to hang in response to a configuration cycle, because a peer device is absent, or simply not being responsive. Moreover, any configuration preference due to the location of the peer device in the system (i.e., device number) is eliminated. The method of the invention allows peer devices to be configured as any desired device number the system would require.

Figure 1:
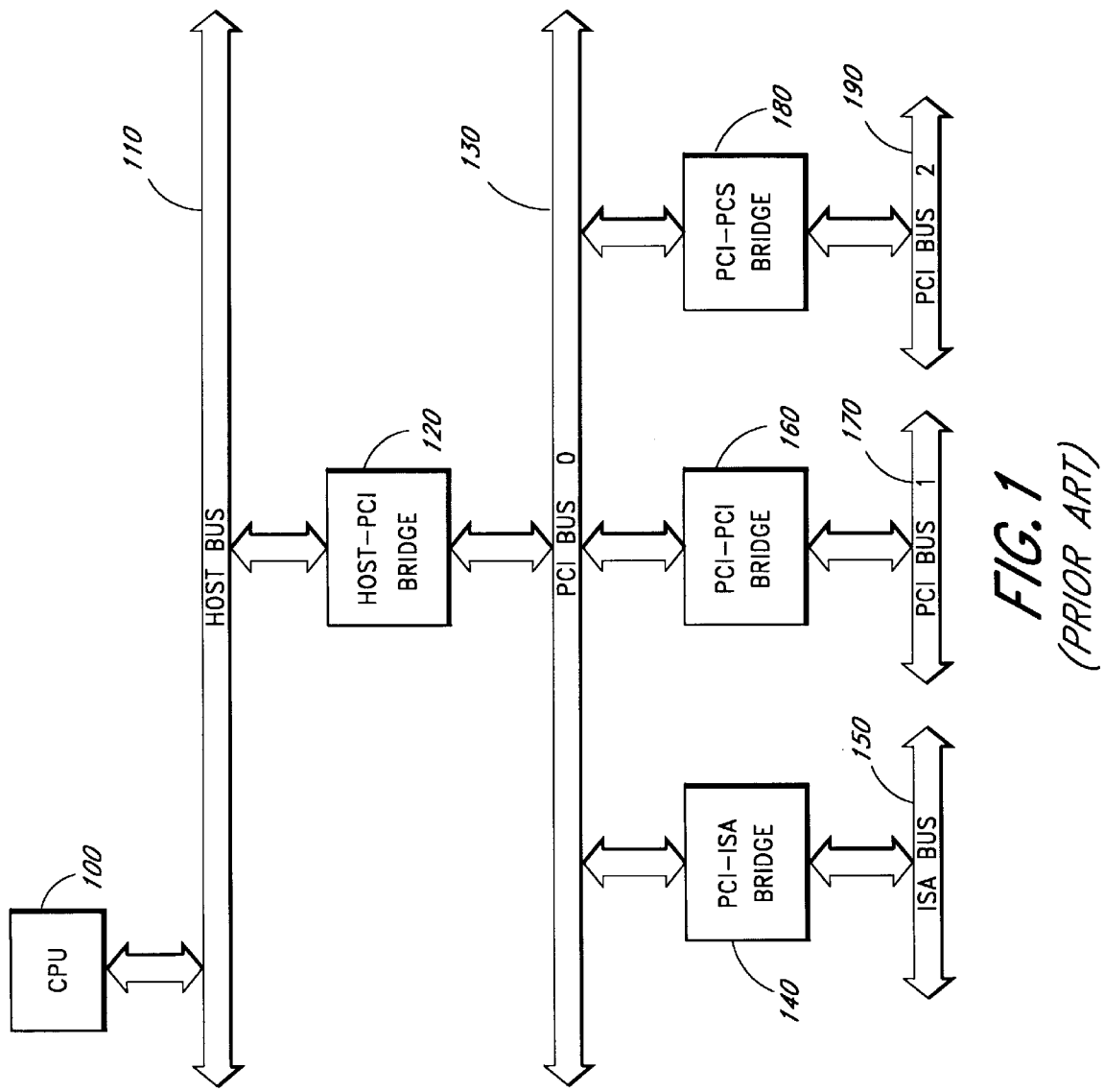
FIG. 1 is functional block diagram of a conventional hierarchical peripheral component interconnect (PCI) bridge architecture.
Figure 3:
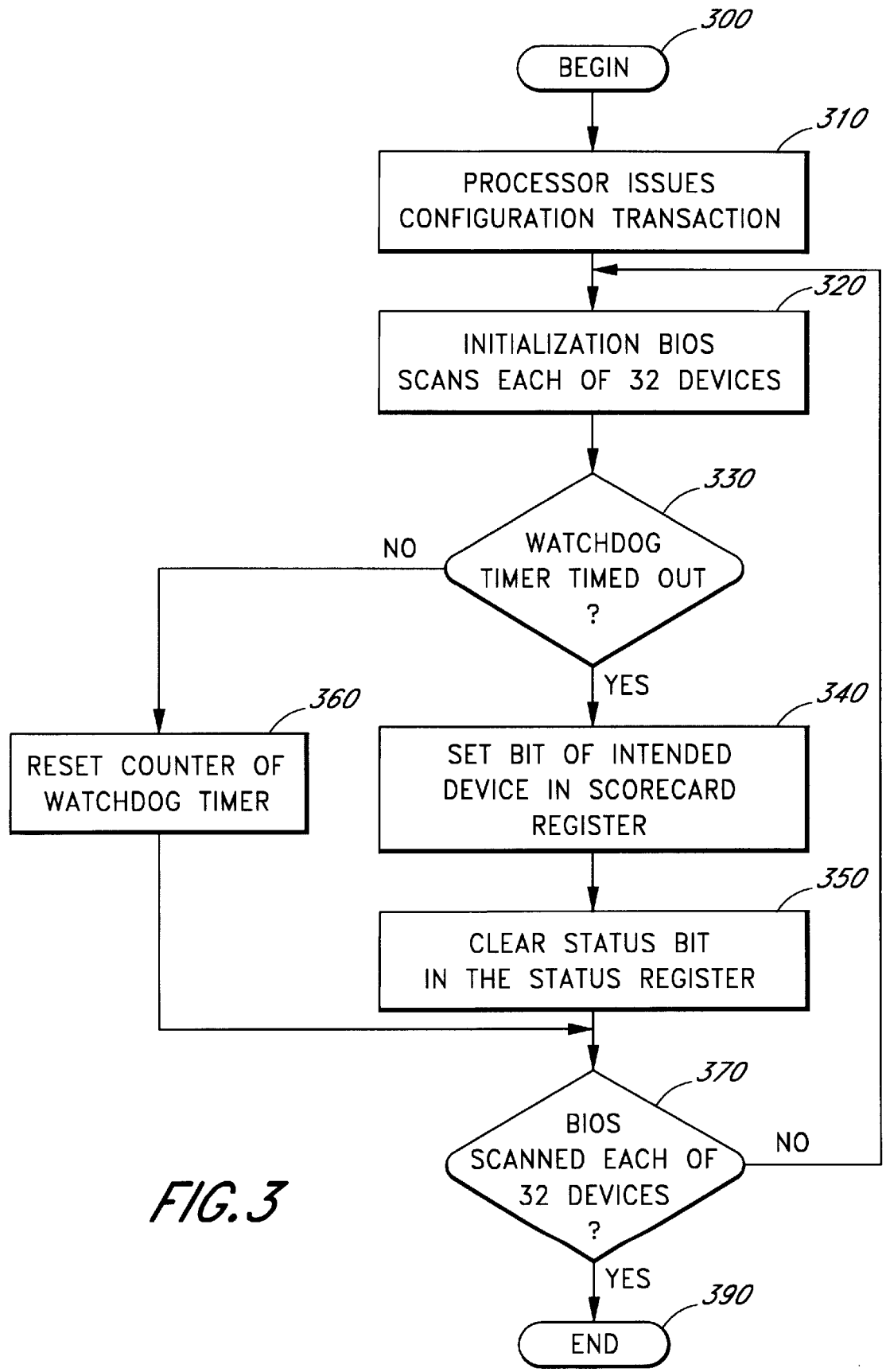
FIG. 3 is a functional flow chart describing the decisional steps of one embodiment of the invention during a configuration cycle.

In one embodiment of the invention, the PCI peer-peer bridge/bus architecture of FIG. 2 is used to provide an efficient method of configuring peer devices. FIG. 3 is a flow chart describing the decisional steps of said method during a configuration cycle. At the system level, as shown at step 310, the CPU 200 typically initiates configuration cycles to devices in the system. When configuring the system, the O/S assumes that peer devices are physically organized in the conventional architecture of FIG. 1. An initialization basic input/output system (BIOS) determines which configuration cycles are to be physically initiated to the PCI bus 0 230, and which configuration cycles are intended for peer devices on the Host bus 210. As noted above, up to 32 peer devices (device 0-31) may be installed in the system.

Upon power-up, some or all bits of the scorecard register 224 are clear, indicating that some or all of the devices physically reside as peer devices on the Host bus 210. At step 320, the initialization BIOS scans each of the possible 32 devices by initiating a configuration cycle to each of the 32 devices. At step 330, the initialization BIOS checks the status bit of the status register 226 to determine if a previous configuration cycle caused a bus timeout. If a timeout has occurred (i.e., status bit is set to 1), then a peer device has not responded to the previous configuration cycle and, hence, the intended peer device does not exist on the Host bus 210. At step 340, the initialization BIOS sets the bit, corresponding to the device to which the configuration cycle was directed, to 1 in the scorecard register 224. Setting the bit to 1 indicates that the device does not exist as a peer device on the Host bus 210. At step 350, the initialization BIOS clears the status bit of the status register 226. On the other hand, if the initialization BIOS determines that a timeout has not occurred (i.e., status bit is clear), then a peer device has responded to the previous configuration cycle because the peer device exists on the Host bus 210. Then, no further action is taken and the counter of the watchdog timer 222 is reset at step 360. At step 370, the initialization BIOS determines if all 32 devices have been scanned. If there are devices remaining unscanned, the Initialization BIOS repeats the process from step 320.

After the initialization BIOS has scanned all 32 devices, the scorecard register 224 contains a record which accurately indicates which devices physically reside as peer devices on the Host bus 210. Once the scorecard register 224 has been programmed by the initialization BIOS, future configuration cycles are directed to the proper device on the Host bus 210 with no further bus timeouts. When a bit in the scorecard register 224 is clear, indicating the presence of a peer device, the selected peer device responds to the configuration cycle, and the compatibility bridge does not respond. However, when the bit is set to 1, indicating that a peer device does not exist on the Host bus 210, the compatibility bridge 220 responds to the configuration cycle, and forwards the configuration cycle to the PCI bus 0 230. The process terminates at step 390.

After completing the above-described process, no further bus time-outs occur in the system. Using the bit information in the scorecard register 224, future configuration cycles are directly forwarded to the location of the particular device where installed. Hence, in booting up a computer system, minimal time is spent.

In view of the foregoing, it will be appreciated that the invention overcomes the long-standing need for a method of configuring peer devices without the disadvantages of improper system boot up, or unnecessary delay in boot up time. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of configuring devices in an information processing system having a host bus and a memory register, said method comprising:

initiating a configuration cycle;

scanning the host bus for a device;

storing and maintaining in said memory register the logical state of a bit corresponding to the device, the bit representing presence of the device;

responding to the initiated configuration cycle; and initiating a subsequent configuration cycle that reads said memory register to configure the device without scanning the host bus.

2. The method as defined in claim 1, wherein the act of scanning the device includes the act of determining if the configuration cycle has timed out on the host bus.

3. The method as defined in claim 1, further comprising the act of forwarding the subsequent configuration cycle to a different bus when the bit corresponding to the device is set.

4. The method as defined in claim 3, further comprising the act of initiating a local configuration cycle on the different bus.

5. The method as defined in claim 1, wherein the act of storing and maintaining the logical state of the bit includes the act of setting the bit after a time-out period.

6. The method as defined in claim 1, wherein the act of responding to the configuration cycle includes the act of designating a compatibility bridge to respond to the configuration cycle after a time-out period.

7. A program storage device storing instructions that when executed by a computer perform the method comprising:

initiating a configuration cycle;

scanning the host bus for a component;

storing and maintaining in a memory register the logical state of a bit corresponding to the component, the bit representing presence of the device;

responding to the initiated configuration cycle; and initiating a subsequent configuration cycle that reads said memory register to configure the device without scanning the host bus.

8. The storage device as defined in claim 7, wherein the act of scanning includes the act of determining if the configuration cycle has timed out on the host bus.

9. The storage device as defined in claim 7, wherein the method further comprises the act of communicating the subsequent configuration cycle to a different bus when the bit of the component is set.

10. The storage device as defined in claim 9, wherein the method further comprises the act of initiating a local configuration cycle on the different bus.

11. The storage device as defined in claim 7, wherein the act of storing and maintaining the logical state of a bit includes the act of setting the bit after a time-out period.

12. The storage device as defined in claim 7, wherein the act of responding to the configuration cycle includes the act of designating a bridge to respond to the configuration cycle after a time-out period.

13. The method as defined in claim 1, further comprising timing out in the event that the device does not respond to the configuration cycle.

14. The method as defined in claim 13, wherein timing out includes indicating that the device is not present on the host bus.

15. The storage device as defined in claim 7, wherein the method further comprises timing out in the event that the device does not respond to the configuration cycle.

16. The storage device as defined in claim 7, wherein timing out includes indicating that the device is not present on the host bus.

* * * * *